United States Patent [19]

Ivkovich

[11] Patent Number: 5,704,972
[45] Date of Patent: Jan. 6, 1998

[54] PRODUCT AND PROCESS FOR STRONG LIGHT-WEIGHT AGGREGATE

[75] Inventor: Daniel P. Ivkovich, Fairfield, Ohio

[73] Assignee: Trans Ash, Inc., Cincinnati, Ohio

[21] Appl. No.: 787,605

[22] Filed: Jan. 23, 1997

[51] Int. Cl.$^6$ .................. C04B 18/02; C04B 40/00; C04B 14/04

[52] U.S. Cl. .................. 106/710; 106/792; 106/799; 106/DIG. 1; 106/679; 264/117; 264/118; 264/234; 264/235; 264/DIG. 49; 264/69; 264/333

[58] Field of Search .................. 106/792, 710, 106/DIG. 1, 799, 679; 264/118, 117, 333, 69, DIG. 49, 234, 235

[56] References Cited

U.S. PATENT DOCUMENTS

| | | |
|---|---|---|
| Re. 34,775 | 11/1994 | Nechvatal et al. . |
| 2,900,265 | 8/1959 | Klein . |
| 3,765,920 | 10/1973 | Humphrey . |
| 4,002,483 | 1/1977 | Daugherty et al. . |
| 4,082,561 | 4/1978 | Nakagawa et al. . |
| 4,210,457 | 7/1980 | Dodson et al. . |
| 4,229,222 | 10/1980 | Schneider . |
| 4,268,316 | 5/1981 | Wills, Jr. . |
| 4,377,364 | 3/1983 | Weaver . |
| 4,452,635 | 6/1984 | Noshi et al. . |
| 4,547,223 | 10/1985 | Goto et al. . |
| 4,624,711 | 11/1986 | Styron . |
| 4,741,782 | 5/1988 | Styron . |
| 4,770,831 | 9/1988 | Walker .................. 106/DIG. 1 |
| 4,802,923 | 2/1989 | Hudec . |
| 4,909,849 | 3/1990 | Funderburk .................. 106/DIG. 1 |
| 4,992,102 | 2/1991 | Barbour . |
| 5,047,086 | 9/1991 | Hayakawa et al. . |
| 5,057,009 | 10/1991 | Nechvatal et al. . |
| 5,070,995 | 12/1991 | Schaffer et al. . |
| 5,114,617 | 5/1992 | Smetana et al. . |
| 5,183,505 | 2/1993 | Spinney . |
| 5,196,620 | 3/1993 | Gustin et al. . |
| 5,211,750 | 5/1993 | Smith et al. .................. 106/DIG. 1 |
| 5,266,111 | 11/1993 | Barbour . |
| 5,322,562 | 6/1994 | Ellenberger et al. . |
| 5,352,288 | 10/1994 | Mallow . |
| 5,482,458 | 1/1996 | Kyffin . |
| 5,484,479 | 1/1996 | Weber . |
| 5,500,044 | 3/1996 | Meade et al. .................. 106/DIG. 1 |
| 5,542,977 | 8/1996 | Hanst .................. 106/792 |

Primary Examiner—Michael Marcheschi
Attorney, Agent, or Firm—Steven J. Rosen

[57] ABSTRACT

The present invention provides a method and mixture for use in forming strong light-weight aggregate and includes by weight about; 68% to 95% fly-ash, 2% to 10% hydrated lime, and 3% to 12% alkali hydroxide such as Sodium Hydroxide. While many types of fly-ash may be used, Type F or Type C fly-ash are preferred. The admix is mixed with water to form a slurry including water in a range of 10% to 25% by weight of the dry mixture and the slurry is then compacted. The compacted slurry is then cured such as by using a rotary kiln or by in situ open air curing. The cured slurry is then allowed to hydrolyzed to form a hard material which then may be crushed and optionally screened to form an aggregate having a particular size or range of sizes.

10 Claims, 2 Drawing Sheets

PRODUCT AND PROCESS FOR STRONG LIGHT-WEIGHT AGGREGATE

BACKGROUND OF THE INVENTION

1. Field of the Invention

The present invention relates to products and processes use fly-ash for producing light-weight high strength aggregates useful in the production of structural products.

2. Discussion of the Background Art

"Aggregate", as referred to herein, is a term which includes natural aggregate, such as sand, gravel and crushed stone, as well as synthetic aggregate of various kinds, including light-weight aggregate such as cinders and aggregate produced through the combustion of pulverized powdered coal. Generally, aggregate may be used in a variety of construction and landscaping applications. For example, aggregate is an essential ingredient in most concrete formulations, including both pre-cast and cast-in-place concrete. Aggregate is also used as a foundation material for paving, and as a backfill material. Aggregate is also used in landscaping applications in both a decorative and functional manner.

When used as a construction material, aggregate is frequently required to meet certain requirements relating to its physical and chemical characteristics. Those characteristics indicate the level of quality to which it conforms. Durability is one of the most significant elements of quality in aggregate. The prior art recognizes there is a great desire to use fly-ash as a major ingredient in the manufacture of a synthetic aggregate. Fly ash is the finely divided residue resulting from the combustion of material containing coal as its major fuel source for combustion, such as that which is produced in electricity generating power plants. The fuel may also contain tires, wood, and/or other petro-coke constituents. It is typically collected as a fine particulate from the combustion gases before they are discharged into the atmosphere. Generally, there are two more particular classes of fly ash, the composition of which is dependent upon the composition of the original combustible material from which it is derived. Class F fly ash is normally produced from anthracite or bituminous coal, and has pozzolanic properties, i.e. little or no cementitious value, but capable of chemically reacting with calcium hydroxide to form compounds possessing cementitious properties. Class C fly ash is normally produced from lignite or sub-bituminous coal, and has some cementitious properties, in addition to pozzolanic properties.

Class C fly ash is known to be highly reactive when mixed with water, and flash setting (setting which occurs in about 2 minutes or less) will generally occur unless a reaction sequestering admixture is utilized. Use of Class C fly ash in the manufacture of lightweight aggregate and lightweight cement formulations has been suggested, for example, in U.S. Pat. Nos. 4,624,711, and 4,741,782, both to Styron, and U.S. Pat. No. 4,659,385 to Costopoluos et al. Styron suggests the use of Class C fly ash along with a foaming agent and an accelerator, expenses the present invention seeks to avoid, to make lightweight aggregate in a pelletizing process. Depending upon the type of fly ash used, Styron also recommends the addition of Portland cement, another expense the present invention seeks to avoid. Costopoluos suggests the use of Class C fly ash to make a lightweight building material. Costopoluos suggests the use of air entraining and chemical foaming agents, another expense the present invention seeks to avoid.

U.S. Pat. No. 5,484,479 entitled "Method of Manufacturing Synthetic Aggregate" describes much of the background of aggregates and their use as well as disclosing a method for making synthetic aggregate using fly-ash. The method proscribes to combine fly-ash with water to form a soil-like mixture which is then compacted into slabs and allowed to set. After setting, the material is crushed to appropriate size. Since fly-ash and water mixtures set quickly, and since compaction should take place prior to setting of the mixture, a set sequestering admixture may be used to facilitate the process. This process uses dry Class C fly-ash metered from a container which is then introduced to a mixing device where it is sprayed with a fine mist of water droplets. The fly-ash and water are metered at rates sufficient to produce a soil-like mixture. The mixture is then distributed and uniformly consolidated, preferably by mechanical compaction, to densify the mixture. The densified mixture is then allowed to cure to a hardened mass and after a predetermined minimum time, the material is then broken or crushed into appropriately sized aggregate conforming to specific gradations established for conventional crushed aggregates. However, expensive materials are used to promote the formulation of stable ettringite and straetlingite compounds which is accomplished with the use of an admixture like those used to retard the setting of portland cement. The patent suggests using sugar to form the admixture and that lignosites, both calcium and sodium, are also usable to effectively sequester or retard the setting process. However, a preferred set sequestering admixture is sodium-glucoheptonate.

The present invention provides a process, product by process, and mixture used in the process for producing a light-weight aggregate that is economical, light-weight, and consistent with standards as detailed by ASTM's (American Society for Testing Materials) specifications for light-weight aggregate.

SUMMARY OF THE INVENTION

The present invention provides a mixture for use in forming strong light-weight aggregate and includes by weight about; 68% to 95% fly-ash, 2% to 10% hydrated lime, and 3% to 12% alkali hydroxide. Any type of fly-ash may be used but it appears Type F or Type C fly-ash is preferred. The alkali hydroxide may be Sodium Hydroxide and the mixture may be an admix in which case the alkali hydroxide is a dry alkali hydroxide. A more particular embodiment of the present invention provides the mixture in the form of a slurry including water in a range of 10% to 25% by weight of the dry mixture. Another embodiment of the mixture is a compacted slurry.

The mixture may contain other reactants which produce the alkali hydroxide. The mixture in such a case includes three constituents comprising fly ash, hydrated lime, and alkali hydroxide producing reactants which results in the mixture having 68% to 95% fly-ash, 2% to 10% hydrated lime, and 3% to 12% alkali hydroxide by weight of the three constituents.

The present invention includes a method for making aggregate by (a) preparing a mixture comprising by weight about, 68% to 95% fly-ash, 2% to 10% hydrated lime, and 3% to 12% alkali hydroxide; (b) preparing a slurry including water in a range of 10% to 25% by weight of the mixture in (a); and (c) compacting the slurry. A more particular embodiment of the present invention includes introducing the compacted slurry from step (c) into a rotary kiln where the compacted slurry is rotated and heated such that it is pelletized resulting in pellets which are then hydrolyzed. In a yet more particular embodiment, the slurry is compacted and introduced into the rotary kiln by augers or extruders. In a more particular embodiment, the compacted slurry is rotated and heated for a period of time in a preferred range of between 2 and 30 minutes and at a temperature between 150 and 1000 degrees Fahrenheit. Then the product formed in the rotary kiln may be removed and crushed to form the aggregate with a predetermined size.

The compacted slurry in step (c) may also be formed in situ by spreading the slurry on a substantially level surface and then compacting the slurry by rolling for which a vibratory roller may be used. A hydrolyzed product may be made by curing the compacted slurry in situ by letting the compacted slurry sit until it has a predetermined compression level. The method may include excavating the hydrolyzed product and crushing and screening crushed hydrolyzed product to form the aggregate with a predetermined size. The method may further include curing the compacted slurry until an ASTM standards compression test indicates that the compacted slurry has cured and resulting in cured material that achieves at least a 2000 PSI compression rating.

ADVANTAGES OF THE INVENTION

The present invention provides a light-weight aggregate that uses fly-ash waste product and is economical, strong, hard, and consistent with standards as detailed by ASTM's specifications for light-weight aggregate.

One advantage of the present invention is that fly-ash, an industrial by-product which usually represents a solid waste disposal expense to the producer, is utilized for a beneficial purpose, thereby, reducing disposal expenses. Another advantage is that the present invention will help reduce use of landfills because fly-ash is typically disposed of in landfills and the present invention can reduce use of expensive and undesirable landfills.

Another advantage obtained by the present invention is that the aggregate produced is strong enough to meet current ASTM standards for light-weight aggregates for use in various building materials. Another advantage of the present invention is that the aggregates produced by the present process are strong enough to meet the ASTM standards and are light enough to be classifiable as light-weight aggregates that have a wide range of desirable applications such as concrete masonry units, structural concrete, and insulating concrete.

Another feature of the present invention is that in one embodiment the light-weight aggregates can be cured at ambient temperatures, and does not need to be fired. This feature has the advantage of reducing the energy costs required to manufacture the aggregate which can be quite substantial.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
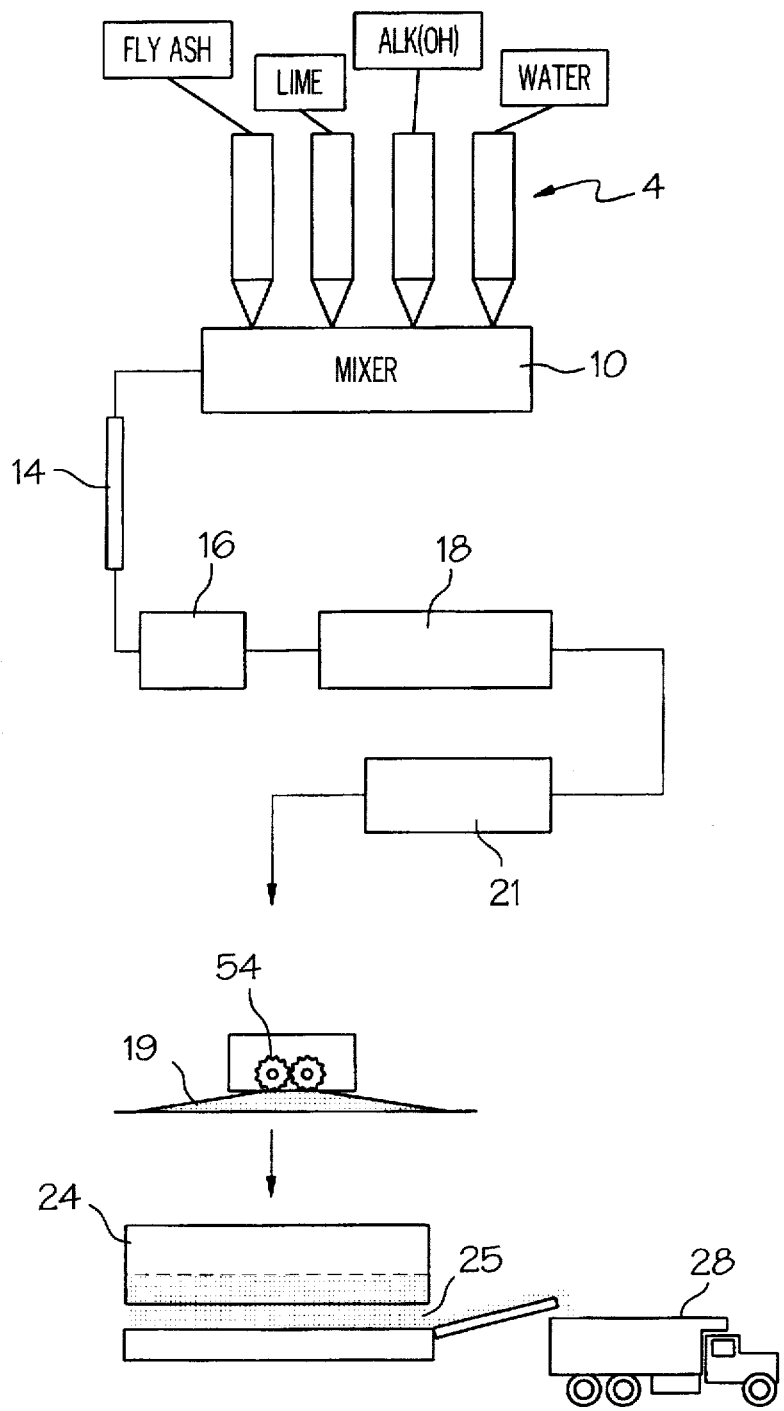
FIG. 1 is a diagrammatic illustration of the process and process apparatus suitable for carrying out a first method in accordance with an exemplary embodiment of the present invention.

The present invention provides a mixture for use in forming strong light-weight aggregate and includes by weight about; 68% to 95% fly-ash, 2% to 10% hydrated lime, and 3% to 12% alkali hydroxide. The fly-ash should be Type F or Type C fly-ash and the alkali hydroxide (Alk(OH)H) is preferably Sodium Hydroxide. The mixture may be an admix in which case the alkali hydroxide is a dry alkali hydroxide. These constituent chemicals are illustrated in the schematic process diagram in FIG. 1. The mixture is preferably made by dry dispensing the constituents from hoppers 4 into a mixer 10 and dry mixing the constituents for about one minute to form an even and uniform admixture. Water is then added to the mixer as the mixer is operating. Water is added in a range of 10% to 25% by weight of the dry mixture. The alkali hydroxide may also be used in liquid form, in which case it is added after dry mixing of the other constituents and before the water is added.

The mixture may contain reactant(s) which produce the alkali hydroxide. Such alkali hydroxide producing reactants include $Na_2CO_3$ together with $Ca(OH)_2$ and $KCO_3$ together with $Ca(OH)_2$, the reactions of which are shown below. The mixture in such a case includes three constituents comprising fly ash, hydrated lime, and alkali hydroxide producing reactants which results in the mixture having 68% to 95% fly-ash, 2% to 10% hydrated lime, and 3% to 12% alkali hydroxide by weight of the three constituents. A surfactant may be added to the water in sufficient amounts to reduce the surface tension of the water in order to enhance the reactions.

The water is added until it forms a slurry 31 that preferably can be molded, and retains its shape. The slurry 31 is preferably then mixed for an additional five minutes. The additionally mixed slurry 31 is then removed from the mixer 10 and transported by a transport belt 14, or some other transport means, to a compacting and injecting means, such as an auger 16 or an extruder, for compacting the slurry and injecting it into a rotary kiln 18. The slurry compacted 31 is formed into pellets and heated in the kiln 18. Although equivalent kilns or heating means may be used, the rotary kiln is the preferred means. The choice of an auger or extruder is probably one of cost. It appears that an auger is more economical to procure while an extruder is more efficient to operate and can achieve a greater degree of compaction.

One design for the rotary kiln 18 includes a rotary heating chamber that is 22 to 52 feet in length, 24 to 36 inches in inside diameter, and has internal mixing flites removed. Use of a rotary kiln without flites provides rotational characteristics of the kiln that promotes pelletizing and quick setting of the silicates in the outermost surfaces of the pelletized particles. A structural shell formed by this process provides integrity to the product during handling and also seals pellets or particles of the aggregate, which prevents the escape of trapped water which is needed to carry out the slower hydrolysis reactions which begin after the heating in the kiln is substantially complete in the process of the present invention.

Preferred processing parameters of the rotary kiln are between 2 to 30 minutes in the kiln at temperatures ranging from 150 to 1000 degrees F. After the particles or pellets 19 formed in the rotary kiln 18 are removed from the kiln they are allowed to hydrolyze. The particles or pellets 19 formed in the rotary kiln may be removed by transport equipment 21, allowed to hydrolyze, and crushed, such as by a crusher 54, and then optionally screened with commercially available screening apparatus 24 to form the final product aggregate 25 with a predetermined size.

The process is a substantially two stage process the first chemical reactions arise during the mixing of the admix with water and the second being the hydrolysis after the heating in the kiln.

The following exemplary reaction mechanisms are believed to be the possible first stage reactions:

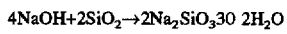  1.

or

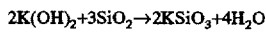  2.

or using alkali hydroxide producing reactants

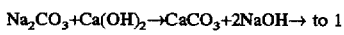  3.

or

  4.

All of these reactions produce a soluble silicate product. This product, which reacts with temperature and hardens, although still water soluble, provides a method in which to mass produce aggregate product using a continuous firing scheme such as in conjunction with the rotary kiln. The material after being processed through the rotary kiln can be crushed, such as by the crusher 54 or some other crushing machine, and if so desired also screened, with commercially available screening apparatus 24, to form an aggregate 25 of a desired size, wetted down and stored in a non-controlled fashion. At this point the second reaction system takes control.

The second stage reactions are of a typical hydraulic nature. Chemicals in the mixture which contain a high percentage of calcium hydroxide will react with fly-ash present in the mixture and make use of the pozzolanic nature of the silica present in the fly-ash and carbon dioxide present in the atmosphere. This results in a final aggregate product which is light-weight, hard and strong. This final product aggregate may be used for many applications including roads, concrete structures, and fill.

Figure 2:
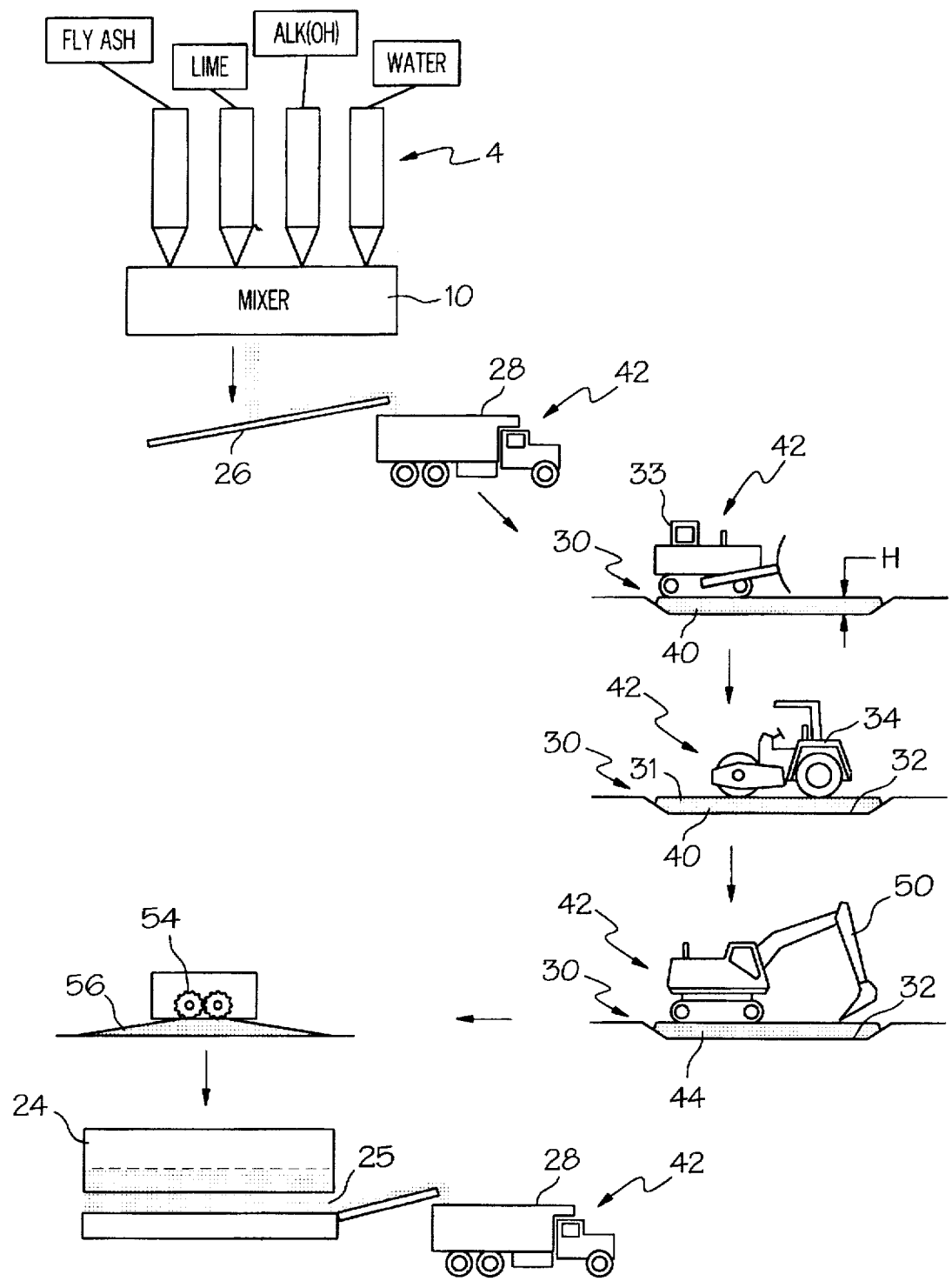
FIG. 2 is a diagrammatic illustration of the process and process apparatus suitable for carrying out a second method in accordance with another exemplary embodiment of the present invention.

Another method utilizes in situ or on site hydrolysis of the slurry as illustrated in FIG. 2. In this method, the slurry is removed from the mixer 10 and transported by a transport belt 26 to a truck 28 or some other hauling means, to a site 30 for compacting and hydrolysis. The aggregate is formed in situ by spreading the slurry 31, such as with a dozer 33, on a substantially level surface 32 of the site 30 and then compacting the slurry by rolling for which a vibratory roller 34 may be used. The slurry 31 is preferably spread using a "dozer" type piece of construction equipment to place the material in lifts 40 of from about 6 inches to 30 inches in height H. This is then "rolled" using a vibratory roller or other comparable equipment. As few as six passes of the roller have been found to be sufficient to complete this step of the process. The compacted slurry preferably remains in the site to cure and hydrolyze. An ASTM standards compression test may be used to indicate the cured and hydrolyzed material 44 is sufficiently hydrolyzed and hard. Alternatively it has been found useful to test the hydrolyzed material 44 to see if it has achieved a 2000 PSI or better compression rating. At this point in the process mining equipment 42 is preferably used to excavate, screen, and load the hydrolyzed material 4 for transport to market. An excavator 50 may be used to excavate the cured material, the crusher 54 may be used to crush excavated hydrolyzed material 56, the screening apparatus 24 may be used to screen crushed material 58 to form an aggregate 25, and the aggregate can then be transported by a truck 28 to a desired place or market.

A hydrolyzed aggregate product made by curing the compacted slurry in situ by letting the compacted slurry sit until it has a predetermined compression level as described above is very cost efficient and may be done near a construction site at which the aggregate is to be used. The steps of excavating the hydrolyzed product and crushing and screening crushed hydrolyzed product to form the aggregate with a predetermined size may be readily done using commercially available equipment. In situ curing of the compacted slurry until an ASTM standards compression test indicates that the compacted slurry has cured, such as to at least a 2000 PSI compression rating, helps provide a uniform and predictable aggregate having consistent and repeatable construction properties which further enhances its use and ease of use at construction sites.

While the preferred embodiment of our invention has been described fully, in order to explain its principles, it is understood that various modifications or alterations may be made to the preferred embodiment without departing from the scope of the invention as set forth in the appended claims.

What is claimed is:

1. A method for making aggregate comprising:
 (a) preparing a mixture comprising by weight about, 68% to 95% fly-ash, 2% to 10% hydrated lime, and 3% to 12% alkali hydroxide;
 (b) preparing a slurry by adding water to the mixture of (a) in a range of 10% to 25%;
 (c) compacting said slurry;
 (d) introducing the compacted slurry into a rotary means to rotate the compacted slurry to form pellets; and
 (e) removing the pellets from the rotary means and allowing them to hydrolyze.

2. A method as claimed in claim 1 wherein step (d) comprises introducing the compacted slurry from step (c) into a rotary kiln wherein the compacted slurry is rotated and heated such that it is pelletized.

3. A method as claimed in claim 2 wherein the slurry is compacted and introduced into the rotary kiln by way of an auger or an extruder.

4. A method as claimed in claim 2 wherein the compacted slurry is rotated and heated for a period of time between 2 and 30 minutes and at a temperature between 150 and 1000 degrees Fahrenheit.

5. A method as claimed in claim 2 further comprising the step of crushing the pellets to form the aggregate.

6. A method for making aggregate comprising:
 (a) preparing a mixture comprising by weight about, 68% to 95% fly-ash, 2% to 10% hydrated lime, and 3% to 12% alkali hydroxide;
 (b) preparing a slurry by adding water to the mixture of (a) in a range of 10% to 25%;
 (c) forming a compacted slurry in situ by spreading the slurry on a level surface and then compacting the slurry by rolling.

7. A method as claimed in claim 6 wherein the slurry is compacted by rolling using a vibratory roller.

8. A method as claimed in claim 6 further comprising the step of forming a hydrolyzed product by curing and hydrolyzing the compacted slurry in situ by letting the compacted slurry sit until it has cured, hydrolyzed, and hardened.

9. A method as claimed in claim 8 further comprising the step of excavating the hydrolyzed product and crushing and screening the excavated hydrolyzed product to form the aggregate.

10. A method as claimed in claim 9 wherein the hydrolyzed product has at least a 2000 PSI compression strength.

* * * * *